United States Patent
Mizell et al.

(10) Patent No.: US 7,027,825 B2
(45) Date of Patent: Apr. 11, 2006

(54) GPRS NETWORK AND METHOD THEREFOR

(75) Inventors: Jerry Mizell, Plano, TX (US); Curtis Provost, Parker, TX (US); David J. Lauson, McKinney, TX (US)

(73) Assignee: Nortel Networks, Limited, St. Laurent (CA)

( * ) Notice: Subject to any disclaimer, the term of this patent is extended or adjusted under 35 U.S.C. 154(b) by 381 days.

(21) Appl. No.: 09/742,043

(22) Filed: Dec. 20, 2000

(65) Prior Publication Data

US 2002/0077132 A1   Jun. 20, 2002

(51) Int. Cl.
*H04Q 7/20* (2006.01)

(52) U.S. Cl. ............ 455/466; 455/412.1; 455/426.1; 455/445; 370/352; 370/353

(58) Field of Classification Search ........... 455/466, 455/412.1, 414.1, 412, 458, 426.1, 448, 433, 455/517, 432.2; 370/352, 353
See application file for complete search history.

(56) References Cited

U.S. PATENT DOCUMENTS

| | | | | |
|---|---|---|---|---|
| 5,978,685 A * | 11/1999 | Laiho | ............... | 455/466 |
| 5,987,022 A * | 11/1999 | Geiger et al. | ............... | 370/349 |
| 6,104,929 A * | 8/2000 | Josse et al. | ............... | 455/445 |
| 6,308,075 B1 * | 10/2001 | Irten | ............... | 455/466 |
| 6,370,390 B1 * | 4/2002 | Salin | ............... | 455/466 |
| 6,424,828 B1 * | 7/2002 | Collins et al. | ............... | 455/466 |
| 6,463,055 B1 * | 10/2002 | Lupien et al. | ............... | 370/353 |
| 6,480,717 B1 * | 11/2002 | Ramaswamy | ............... | 455/445 |
| 6,505,047 B1 * | 1/2003 | Palkisto | ............... | 455/456.1 |
| 6,560,457 B1 * | 5/2003 | Silver et al. | ............... | 455/445 |
| 6,622,016 B1 * | 9/2003 | Sladek et al. | ............... | 379/201.01 |
| 6,717,925 B1 * | 4/2004 | Leppisaari et al. | ............... | 370/312 |
| 6,728,208 B1 * | 4/2004 | Puuskari | ............... | 370/230.1 |
| 6,728,530 B1 * | 4/2004 | Heinonen et al. | ............... | 455/414.1 |

* cited by examiner

*Primary Examiner*—William Trost
*Assistant Examiner*—Brandon J. Miller
(74) *Attorney, Agent, or Firm*—Garlick Harrison & Markison, LLP; James A. Harrison

(57) ABSTRACT

A system for delivering SMS messages to a mobile terminal includes an apparatus and method that deliver the SMS messages either using legacy SMS message formats or data packet formats. Additionally, a connection is created between a message center and a gateway GPRS support node wherein SMS messages may be transmitted to the gateway GPRS support node in a data packet format. To provide this capability, the gateway GPRS support node includes a unique port address for receiving SMS messages and circuitry for processing SMS messages received in a data packet format. A serving GPRS support node is formed to include circuitry for determining whether to transmit the SMS message to the mobile terminal in a data packet format or in a legacy SMS message format.

13 Claims, 8 Drawing Sheets

GPRS NETWORK AND METHOD THEREFOR

CROSS REFERENCE TO RELATED APPLICATIONS

This application incorporates by reference and is related to the following applications filed concurrently herewith:
1. Application Ser. No. 09/742,042 entitled: Dual Protocol GPRS Message Center and Method Therefor
2. Application Ser. No. 09/742,045 entitled: Gateway GPRS Support Node and Method Therefor
3. Application Ser. No. 09/742,046 entitled: Dual Protocol GPRS Mobile Terminal and Method Therefor

BACKGROUND

1. Technical Field

The present invention relates generally to mobile communication systems and more particularly, to general packet radio services for delivering data over a circuit switch telephone network.

2. Related Art

The general packet radio service (GPRS) is a new non-voice value added service that allows information to be sent and received across a mobile telephone network. It supplements, or rides on top, of today's circuit switched data and short message service networks. The theoretical maximum speed of GPRS includes speeds of up to 171.2 kilobits per second (kbps). This maximum speed is achievable in GPRS systems using all eight timeslots at the same time in a time division multiple access (TDMA) context.

This speed is about three times as fast as data transmission speeds possible over today's fixed telecommunication networks and ten times as fast as current circuit switched data services on Global System for Mobile Communications (GSM) standard TDMA networks. Thus, GPRS systems are advantageous in that they require less system resources to transmit a fixed amount of data in comparison to using a traditional circuit switched approach. By allowing information to be transmitted more quickly, immediately, and efficiently, across the mobile network, GPRS may well be a relatively less costly mobile data service compared to SMS and circuit switch data.

GPRS also facilitates instant connections in which information can be sent or received immediately as the need arises, subject to radio coverage. No dial up modem connection is necessary. GPRS, similar to some broadband connections for personal computers, often is referred to as being "always connected." Thus, another one of the advantages of GPRS is that data may be transmitted immediately, whenever the need arises. In contrast to circuit switched data in which a connection must be established to transmit a data packet or data file, GPRS operation is extremely efficient in those situations in which a small amount of data is to be sent.

As the emphasis of many designs today are to create wireless computer networks, and to connect data devices including personal computers to wireless transceivers and mobile terminals, such a system that provides instantaneous response is very important for time critical applications, and, more generally, for the implementation of wireless computer networks.

For example, a remote credit card authorization system implemented in a wireless network can be greatly improved if it is unnecessary for the customer to wait the amount of time that is required to establish a connection. Anyone that has waited at a cash register for credit authorization while a modem dials in and transmits account information can readily appreciate this advantage.

Additionally, GPRS facilitates the use of Internet applications not only from personal computers, but also from appliances and machines. It is anticipated that, in the future, appliances will be designed to be coupled to the Internet for control either onsite or remotely. While some people envision connecting these appliances to a network port by physical lines, it would clearly be advantageous to be able to connect such appliances to the Internet through a wireless link. GPRS will facilitate the creation of Internet controlled appliance networks through a wireless medium.

As suggested before, GPRS involves overlaying a packet based air interface on an existing circuit switched wireless network. For example, the circuit switched wireless network may comprise a GSM network. Accordingly, the user is given an option to utilize a packet based data service. In order to overlay a packet based air interface over a circuit switched network, the GPRS standard defines new infrastructure nodes to minimize the impact to existing networks in terms of hardware and software.

One advantage of GPRS is that packet switching that results from the infrastructure nodes allows the use of GPRS radio resources only when users actually are sending or receiving data. Unlike traditional circuit switched voice networks, a connection is not continuously reserved for a user for the intermittent transmission of data. This efficient use of scarce radio resources means that larger number of GPRS users can share the same bandwidth and be served from a single base station 216 or cell. The actual number of users, of course, that may use the system at one time depends on the amount of data being transferred.

Short message service (SMS) is a service that is provided in wireless telecommunication networks that enables short alphanumeric messages to be transmitted to and received from mobile telephones. Typically, a short messaging service center (SMSC) is formed and connected to a wireless network to enable mobile telephones to exchange short text messages with other networks. Typically, a short message service message is transmitted over a short message service channel (SMSCH). For example, in IS-136 networks, the SMSCH carries signaling information for set up and delivery of short alphanumeric messages from the cell site to the user terminal equipment. In IS-136, SMSCH is a logical subchannel of the SMS point-to-point messaging, paging and access response channel, which is a logical channel of the digital control channel. The digital control channel (DCCH) is a signaling and control channel that is employed in cellular networks, more particularly, in time division multiple access (TDMA) networks. The DCCH operates on a set of frequencies separate from those used to support the cellular conversations.

In current systems, either implemented or under design, a message center typically includes SMS processing logic as well as communication protocol logic for signaling system number seven (SS7) wireline circuit switched telephone networks. SS7 networks utilize a circuit switched plane for carrying voice and a tandem control plane to setup the circuit switching as a part of call setup. The message center typically transmit short message service messages over an SS7 network to a mobile switching center (MSC) that, in turn, transmits the SMS message to a serving GPRS support node (SGSN). The SGSN, in turn, forwards the SMS message to the wireless network, and more particular, to the base station for delivery to the destination mobile terminal.

It is desirable, however, to transition from an SS7-based network to a packet network, for example, one with an IP-based infrastructure. Economic and technical advantages, including speed of application development and lower costs due to economies of scale are being realized in the IP industry because of the huge success of the Internet. In order to ease the transition to new network architectures, while also supporting the functionality provided by SMS, there is a need to provide IP-based access to the message center. The current definition of the GPRS network architectures does not allow such IP-based access. Thus, as described before, SS7 telephone networks are used to transport SMS messages between the message center and the SGSN. It would be advantageous, however, if a message center could transmit SMS messages to an SGSN by way of a data packet network such as the Internet.

SUMMARY OF THE INVENTION

A system and method are provided for enabling a GPRS message center to transmit SMS messages over a data packet network, such as the Internet, to a serving GPRS support node. From there, the serving GPRS support node may deliver the SMS message to the SGSN and then to the mobile terminal by way of a base station.

More specifically, a GPRS message center is modified to include an IP communication module in addition to an SMS message processing module and an SS7 communication module. A network port is coupled to the IP module to enable the message center to transmit SMS messages over an IP packet protocol to a gateway GPRS support node. An SMS proxy (SMSP) module is formed within the GGSN to receive and process SMS messages that were transmitted using an IP protocol. The GGSN, then places the SMS message within a GPRS tunneling protocol message for transmission over an IP network to the serving GPRS support node.

The serving GPRS support node, in one embodiment of the invention, transmits the SMS message in an IP protocol to the base station for delivery to the mobile terminal. In an alternate embodiment of the invention, the SGSN removes the IP headers to place the SMS message into a traditional SMS form for transmission through the logical link control (LLC) protocol layer. Thus, the present invention facilitates the use of the Internet for delivery of SMS messages between a serving GPRS node and a GPRS message center in one of two different paths using one of three different forms or protocols.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
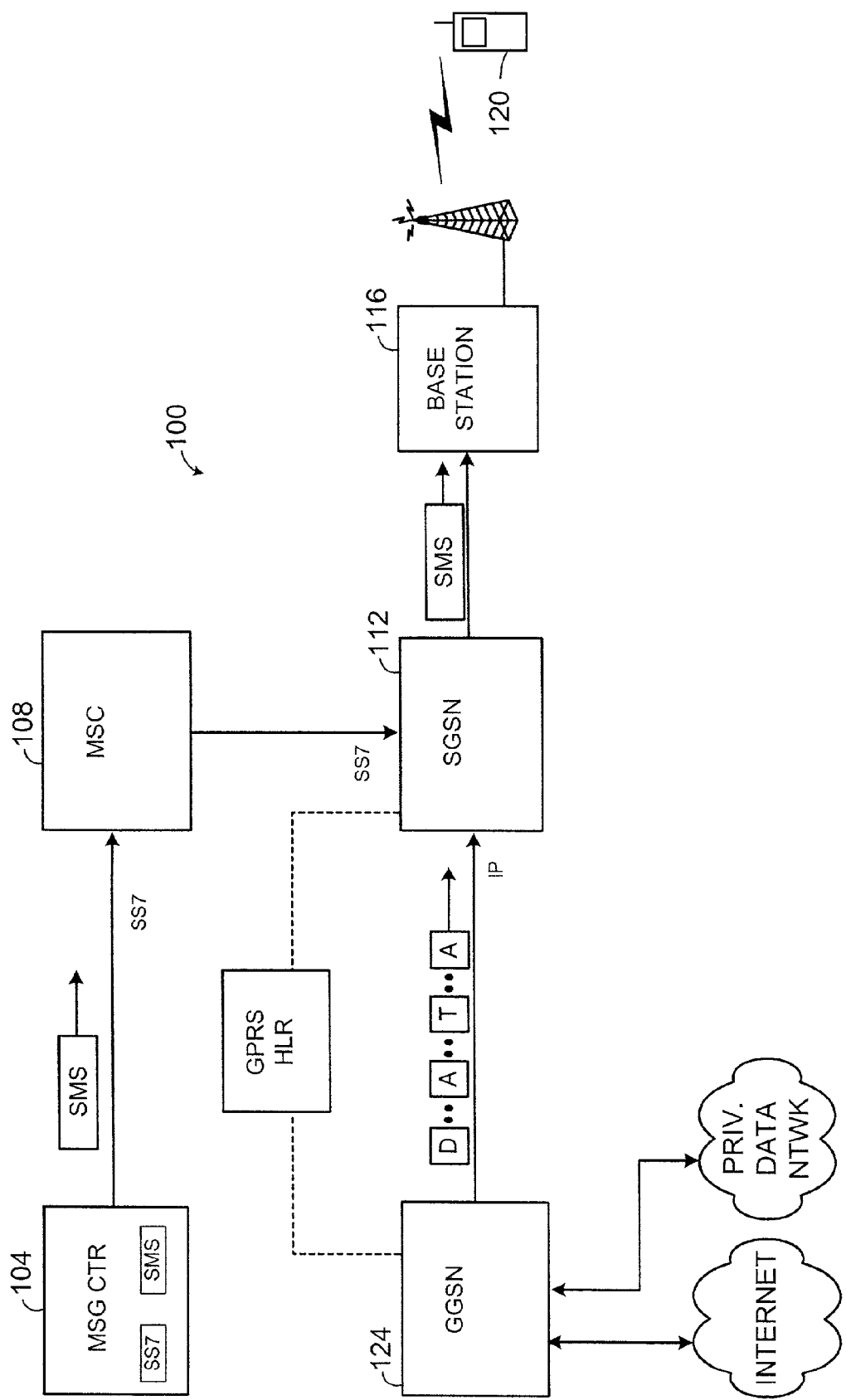
FIG. 1 is a functional block diagram of a GPRS network.

FIG. 1 is a functional block diagram of a GPRS network. GPRS network 100 includes a GPRS message center 104 that is coupled to communicate with a mobile switching center 108 by way of an SS7 network line and to deliver short message service messages thereto. Mobile switching center 108 is coupled to communicate with a serving GPRS service node 112 also by way of an SS7 network line and to forward SMS messages thereto. The SGSN 112 is coupled to communicate with a wireless network for delivering SMS messages to mobile terminals such as mobile terminal 120. For the sake of simplicity, FIG. 1 shows SGSN 112 being connected to a base station 116. It is understood, however, that the wireless network further includes mobile switching centers and base station 216 transceiver systems (BTS) that have their traditional roles in establishing communications with mobile terminals 120.

Once base station 116 receives the SMS message for delivery to the mobile terminal 120, it transmits the message through an antenna in a cell area in which the mobile terminal 120 was last registered for delivery to a mobile terminal 120 over a wireless communication link.

Continuing to refer to FIG. 1, a gateway GPRS support node 124 includes network ports to receive GPRS data packets from the Internet as well as from private data networks, which network ports receive the data packets in an IP protocol. The GGSN 124 then transmits the data packets in an IP protocol to SGSN 112. Thus, SGSN 112 is operable to receive data packets in an IP format for transmission to a mobile terminal 120 by way of base station 116.

Figure 2:
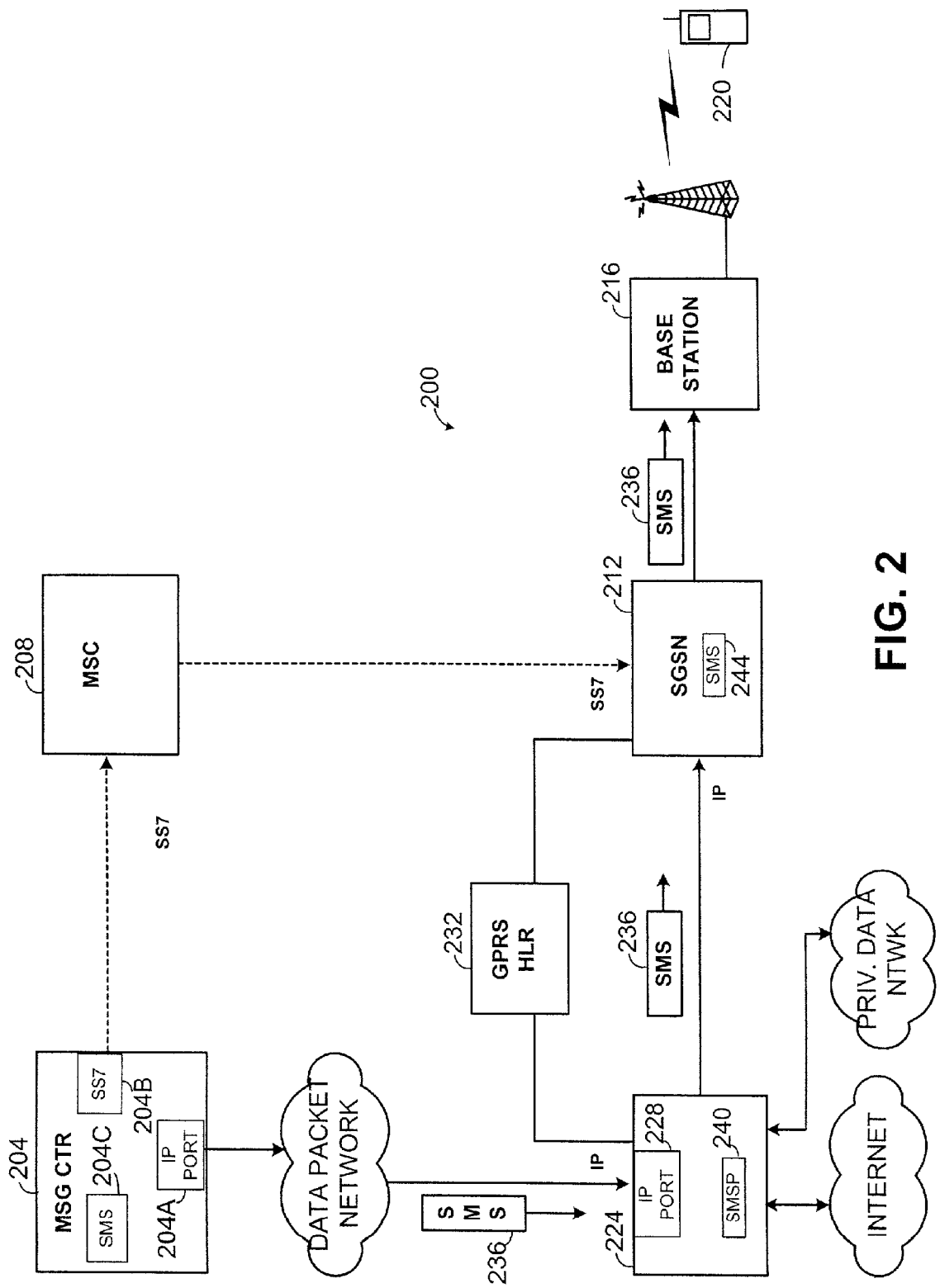
FIG. 2 is a functional block diagram of a GPRS network according to one embodiment of the present invention.

FIG. 2 is a functional block diagram of a GPRS network according to one embodiment of the present invention. As may be seen, the network 200 of FIG. 2 includes a message center 204, a mobile switching center 208, an SGSN 212, a base station 216, and a mobile terminal 220, all coupled as described with respect to FIG. 1. Here in FIG. 2, however, the network 200 includes dashed lines for the SS7 network links between the message center 204, the MSC 208, and the SGSN 212 to reflect those links are there but are not used for the transport of SMS messages within network 200 according to the present invention (although they can be used).

Thus, as may be seen, a GGSN 224 includes an IP network port 228 having an address that is reserved for receiving SMS messages in an IP format from a message center 204. An IP port 204A within message center 204 is coupled to a data packet network comprising multiple communication paths and routers. At least one of the routers within the data packet network is coupled to an IP port 228 within gateway GPRS support node (GGSN) 224. An SS7 communication port 204B is coupled to an SS7 network for transmitting SMS messages to MSC 208. An internal SMS message processing module 204C performs traditional SMS message processing. Additionally, it is formed to determine whether to transmit the SMS messages over the IP or data packet network or over the SS7 network. In an alternate embodiment of the invention, a message center may be formed to only transmit SMS messages over the data packet network. For this embodiment, the SMS processing module 204C does not include the logic for determining whether to transmit the SMS messages over the SS7 or data packet networks.

As may also be seen, GGSN 224 is coupled to communicate with a GPRS home location register (HLR) 232. GPRS HLR 232 further is coupled to SGSN 212. The function of GPRS HLR 232 is to provide mobile terminal 220 location and profile information as needed to GGSN 224 and SGSN 212.

Typically, HLR information is organized and processed in relation to a mobile ID number. Thus, a GGSN seeking profile or location information transmits a request to the HLR containing a mobile ID number. The HLR responds by transmitting the requested information. Before now, however, the GGSN has not generated queries to the GPRS HLR 232 to obtain location information for the delivery of SMS messages. The present GGSN, however, must be able to determine that it has received an SMS message for delivery to a mobile terminal and must then query the GPRS HLR 232 to determine the destination SGSN 212 to which the SMS message should be forwarded.

As may be seen, both the GGSN and the SGSN communicate with GPRS HLR 232 to obtain information regarding mobile terminal 220. GGSN 224 communicates with HLR 232 to determine that the SMS message 236 is to be sent to SGSN 212 based upon the last known location of mobile terminal 220. SGSN 212, however, may require information about the capabilities of mobile terminal 220 so that it can appropriately determine the format of a message that is to be delivered to the mobile. For example, a mobile terminal 220 that is capable of receiving IP data packets would receive SMS messages transmitted in an IP data packet format. A mobile terminal 220 without such a capability, however, would receive an SMS message 236 from SGSN in a legacy SMS message 236 format.

Continuing to examine FIG. 2, the operation of network 200 for delivering a short message service message from message center 204 to mobile terminal 220 is as follows. IP module 204A communicates with SMS module 204B to determine that the message center 204 has a short message service message that needs transmitting to mobile terminal 220 by way of a data packet network. IP module 204A, responsive to determining the same, places IP header information around an SMS message 236 that is to be transmitted through network 200. Additionally, IP module 204A converts the SMS message 236 into an IP format (data packet format) for transmission through network 200. Thereafter, SMS message 236 is transmitted from an IP port 204A over an IP network to IP network port 228 of GGSN 224. IP port 204A specifically assigns address information to the packets that form the SMS message 236 to cause those packets to be routed directly to IP network port 228. As is understood by those skilled in the art, SMS message 236 may actually comprise a plurality of data packets and may actually be transmitted over a plurality of IP network lines to the specific address that causes them to be received at IP network port 228. The representation of one SMS message 236 being transmitted over one line between message center 204 and GGSN 224 is for the sake of simplicity.

When a message center 204 is processing an SMS message 236 for delivery to a mobile terminal 220 and it has the option of transmitting the message by way of a data packet network as well as by way of an SS7 network, it must determine which path to employ. In one embodiment of the invention, the default mode is to transmit by way of the data packet network unless a specified condition is realized. Such specified conditions include determine, from a mobile station ID, that the mobile terminal 220 is not data packet capable. Another specified condition includes determining that a specified level of congestion or delay is being realized for transmissions that include, at least in part, the data packet networks. In an alternate embodiment of the invention, the message center 204 transmits SMS messages in a traditional manner as a default unless it determines, from the mobile station ID, that the mobile terminal 220 is data packet capable and that the corresponding subscriber profile states a preference for receiving SMS messages in a data packet format.

Upon receiving the SMS message 236 data packets, GGSN 224, and more particularly, an SMS Processing Module (SMSP) 240 processes the SMS data packet to continue routing the SMS message 236 to mobile terminal 220. SMSP 240 is formed in hardware in one embodiment of the invention. In another embodiment, however, the logic of SMSP 240 is defined by computer instructions that are executed by an internal processor of GGSN 224.

Initially, SMSP 240 determines whether the destination mobile terminal 220 has an active PDP context. To do so, it communicates with GPRS HLR 232 to determine not only whether the mobile terminal 220 has an active PDP context, but also to determine which SGSN is acting as a serving GPRS support node 212 for the mobile terminal 220. If mobile terminal 220 does have an active PDP context, for example, with SGSN 212, then SMSP 240 merely continues to forward the data packets containing the SMS message 236 to SGSN 212 using a GPRS tunneling protocol. Thus, as may be seen, GGSN 224 transmits SMS message 236 in a GDP protocol to SGSN 212. If mobile terminal 220 does not have an active PDP context, then GGSN 224, and more particularly, SMSP 240 initiates an active PDP context. As a part of determining whether mobile terminal 220 has an active PDP context, the location of mobile terminal 220 and of initiating an active PDP context, SMSP 240 communicates with HLR 232 to obtain the necessary information.

SGSN 212, upon receiving SMS message 236 in the GPRS tunneling protocol may request and receive profile information from GPRS HLR 232. Thereafter, SGSN 212, and more particularly, an SMS module 244 formed within SGSN 212, transmits the SMS message 236 to base station 216 that, in turn, delivers the SMS message 236 to mobile terminal 220 over a wireless interface. As will be described in greater detail, SGSN 212 transmits the SMS message 236 to base station 216 in one of at least two different formats.

While the present invention creates a network that supports the transmission of SMS messages from a message center to an SGSN by way of a data packet network such as the Internet, the SGSN also can and will receive SMS messages from an SS7 format in a traditional manner. Accordingly, the inventive SGSN is coupled and formed to receive and process SMS messages received from a plurality of networks in a plurality of protocol defined formats. Thus, the SGSN further must be formed to determine which, of a plurality of formats, should be used for delivering the SMS message to the mobile terminal by way of a wireless network. For example, the SGSN must determine whether to forward the message in an IP format or in a legacy format as it is likely to receive the message in either of these two formats. Thus, if necessary, the SGSN must convert a message from one format to another.

In the first format, the SMS message 236 is transmitted from SGSN 212 to base station 216 in an IP data packet format. In an alternate embodiment of the invention, established GPRS procedures for delivery of SMS messages through a logical link control (LLC) protocol layer are used for delivering the SMS message 236 from SGSN 212 to base station 216 (and vice versa).

Figure 3:
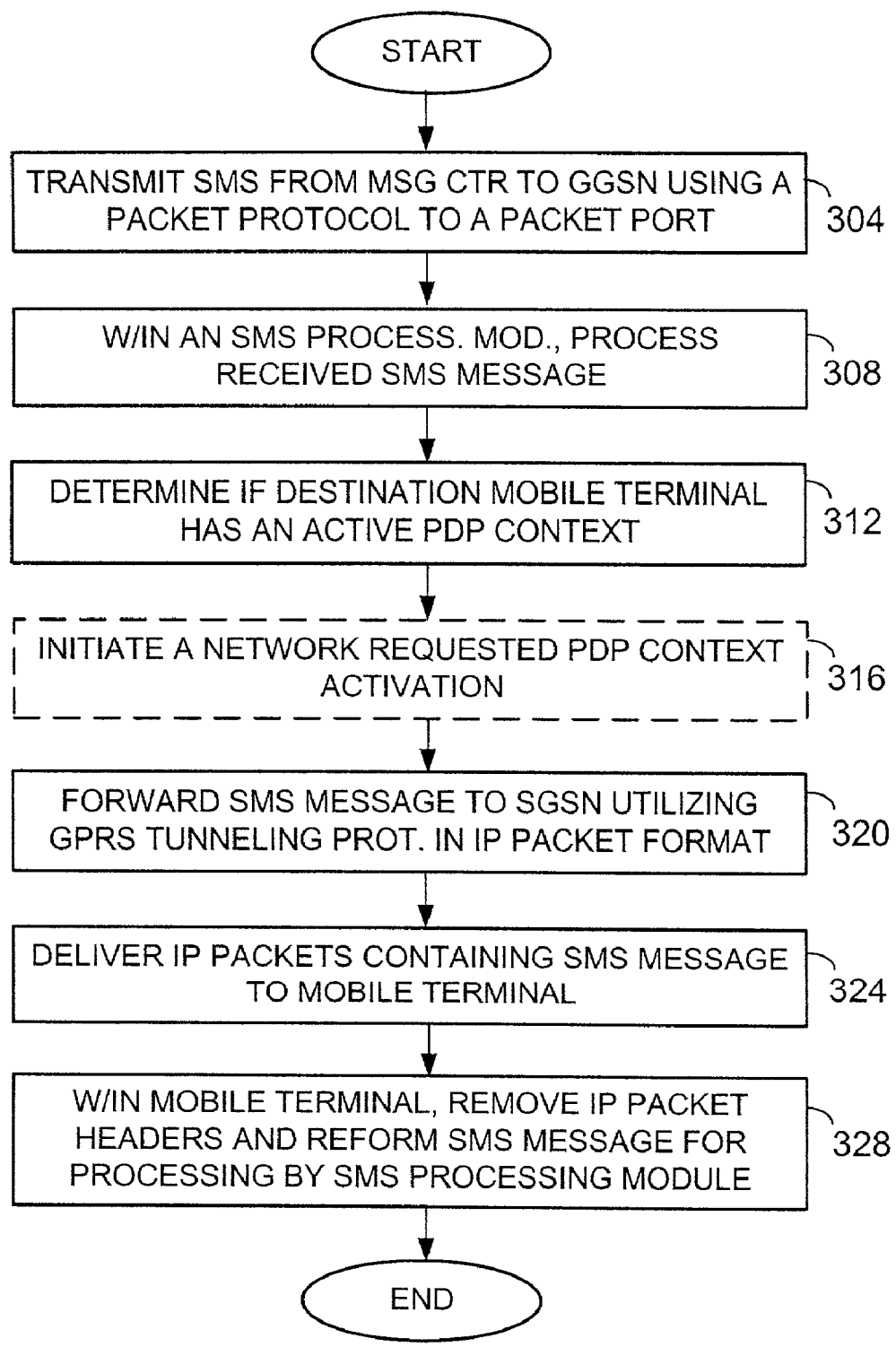
FIG. 3 is a flow chart illustrating a method for delivering SMS messages through a GPRS network according to one embodiment of the present invention.

FIG. 3 is a flow chart illustrating a method for delivering SMS messages through a GPRS network according to one embodiment of the present invention. The following method of FIG. 3 is illustrated with respect to FIG. 2 for exemplary purposes. A GPRS message center 204 determines to transmit an SMS message over an IP network instead of an SS7 network. It then transmits an SMS message 236 to a gateway GPRS support node 224 using a packet protocol to a specified packet port address 228 reserved for receiving SMS messages (step 304). As has been described previously, the gateway GPRS support node 224 defines a specific port address that is exclusively for receiving SMS messages from a GPRS message center 204. Thus, when the message center 204 transmits a plurality of data packets forming an SMS message 236, each of the packets include the specific port address within the GGSN 224 to cause IP routers (not shown) to route the packets thereto.

The data packets are then received at the specific port address and reformed into the initial SMS message 236. Thereafter, within the gateway GPRS support node 224, an SMS processing module 240 processes the received SMS message 236 (step 308). As a part of processing the received SMS message 236, the SMS processing module 240 receives the plurality of data packets that form the SMS message 236. It also analyzes the packets and determines an identity of the mobile terminal 220 to which the message is to be delivered. SMSP 240 also determines if the destination mobile terminal 220 to which the SMS message 236 is to be delivered has an active PDP context (step 312) The presence of an active PDP context indicates that the GGSN 224 has a delivery address or GTP tunnel for the SGSN 212 serving the mobile. In the described embodiment, the SMSP 240 queries GPRS HLR 232 to determine whether there exists an active PDP context for the mobile terminal 220.

If the destination mobile terminal 220 does not have an active PDP context, the GGSN 224 initiates a network requested PDP context activation (step 316). The procedure, as outlined in the GPRS standards, consists of the GGSN 224 contacting the GPRS HLR 232 to retrieve location information for the mobile terminal 220 including the current SGSN 212 serving the mobile terminal 220. The GGSN 224, upon receiving this information, initiates a GTP tunnel and PDP Context Activation with the SGSN 212. This step, of course, is optional according to whether the destination mobile terminal 220 has an active PDP context.

Thereafter, once an active PDP context has been established or it is determined to already be in place, the gateway GPRS support node 224, and more particularly, the SMSP 240 there within, forwards the SMS message 236 to the serving GPRS support node 212 (step 320). The serving GPRS support node 212 is the one that is coupled to a base station 216 for the cell in which the mobile terminal 220 is located.

The gateway GPRS support node 224 forwards the SMS message 236 to the serving GPRS support node 212, in one embodiment of the present invention, utilizing a GPRS tunneling protocol wherein the message is transmitted in an IP packet format. Once the serving GPRS support node 212 receives the message, it forwards the message to the base station 216 for delivery to the mobile terminal 220 (step 324). Within the mobile terminal 220, the received SMS message 236 then is processed to remove the IP packet headers of the IP data packets, and then reconstructs the SMS message 236 and then transmits it to an internal SMS processing module or circuitry (step 328). As is understood by those skilled in the art, the SMS processing module within the mobile terminal 220 may be formed either in hardware or logically by processor-executed software.

Figure 4:
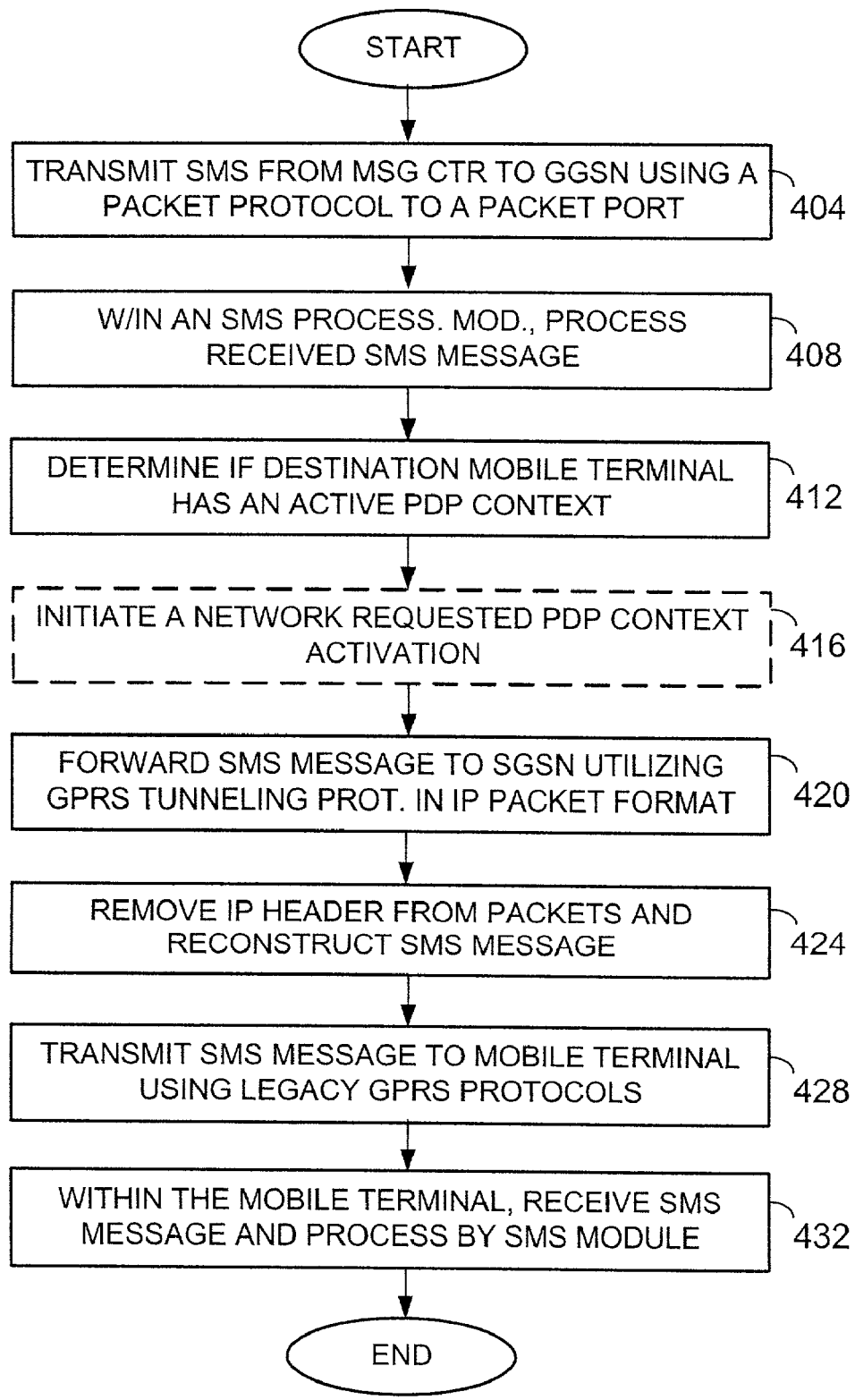
FIG. 4 is a flow chart illustrating a method for delivering SMS messages through a GPRS network according to one embodiment of the present invention.

FIG. 4 is a flow chart illustrating a method for delivering SMS messages through a GPRS network according to one embodiment of the present invention. The following method of FIG. 4 is illustrated with respect to FIG. 2 for exemplary purposes. A GPRS message center 204 transmits an SMS message 236 to a gateway GPRS support node 224 using a packet protocol to a specified packet port defined within the gateway GPRS support node 224 (step 404). As has been described previously, the gateway GPRS support node 224 defines a specific port address that is exclusively for receiving SMS messages from a GPRS message center 204. Thereafter, within the gateway GPRS support node 224, an SMSP 240 processes the received SMS message 236 (step 408). As a part of processing the received SMS message 236, the SMSP 240 determines if the destination mobile terminal 220 to which the SMS message 236 is to be delivered has an active PDP context (step 41 2). The presence of an active PDP context indicates that the GGSN has a delivery address or GTP tunnel for the SGSN serving the mobile.

If the destination mobile terminal 220 does not have an active PDP context, the GGSN initiates a network requested PDP context activation (step 416). This step, of course, is optional according to whether the destination mobile terminal 220 has an active PDP context. Thereafter, once an active PDP context has been established or it is determined to already be in place, the gateway GPRS support node 224, and more particularly, the SMS proxy module there within, forwards the SMS message 236 to the serving GPRS support node 212 (step 420). The serving GPRS support node 212 is the one that is coupled to a base station 216 for the cell in which the mobile terminal 220 is located. The gateway GPRS support node 224 forwards the SMS message 236 to the serving GPRS support node 212, in one embodiment of the present invention, utilizing a GPRS tunneling protocol wherein the message is transmitted in an IP packet format.

After receiving the SMS message 236 from the gateway GPRS support node 224, the serving GPRS support node 212 strips the IP header information that was formed as a part of the IP data packets that comprise the SMS message 236 and reforms the data packets in their proper order to recreate the SMS message 236 (step 424). The serving GPRS support node 212 then transmits the SMS message 236 to the mobile terminal 220 using legacy GPRS protocol procedures (step 428). Finally, the SMS message 236 is received by the mobile terminal 220 and is processed by an SMS processing module formed within the mobile terminal 220 (step 432). The SMS message 236 processing module may be formed either within hardware or within logic defined by computer instructions that are executed by a processor within the mobile terminal 220.

Figure 5:
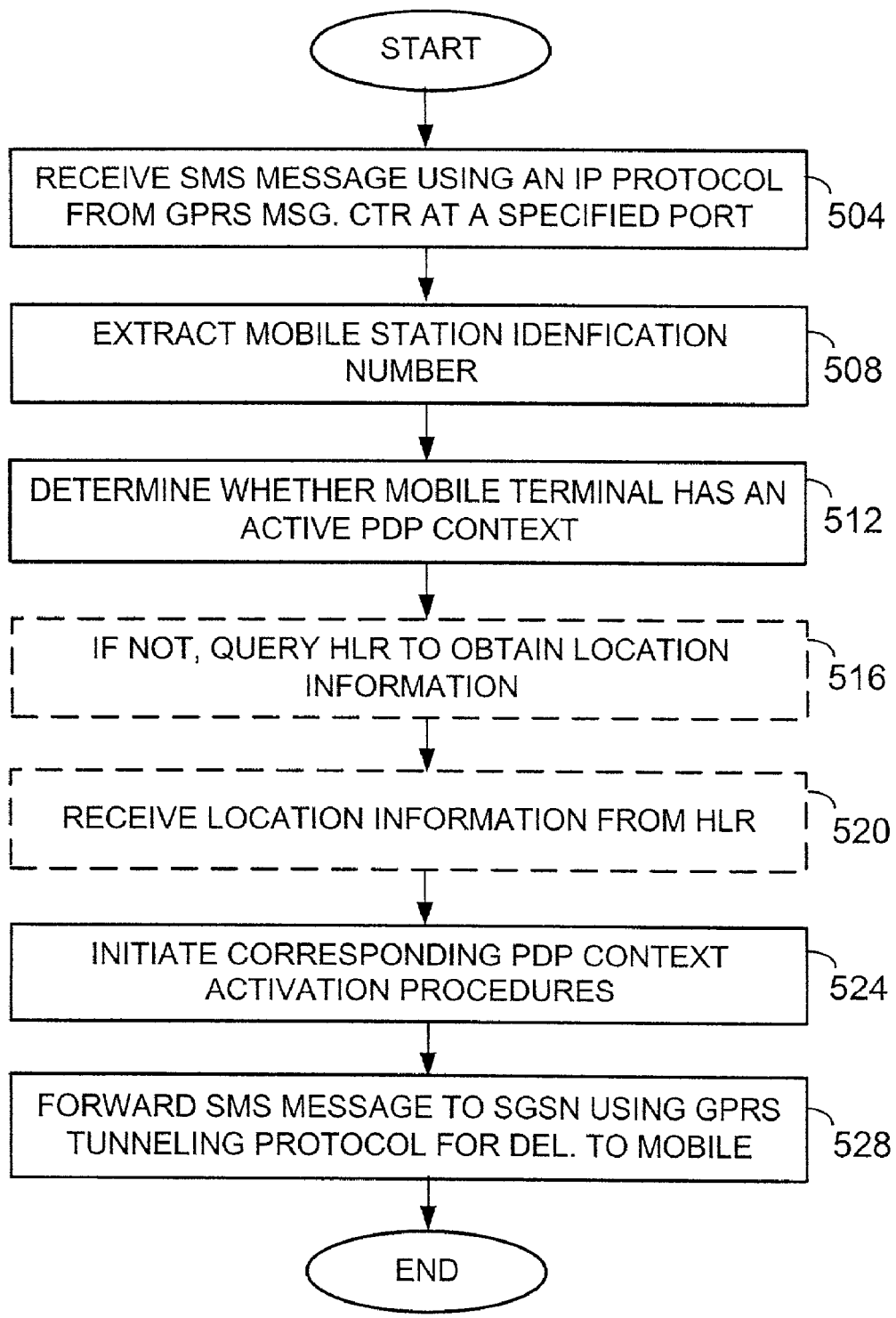
FIG. 5 is a flow chart illustrating a method within a gateway GPRS support node for processing SMS messages.

FIG. 5 is a flow chart illustrating a method within a gateway GPRS support node for processing SMS messages. The following method of FIG. 5 is illustrated with respect to FIG. 2 for exemplary purposes. Initially, a gateway GPRS support node 224 receives an SMS message 236 in a packet protocol from a GPRS message center 204 at a specified port that is for receiving SMS messages (step 504). Thereafter, the gateway GPRS support node 224 extracts the mobile station ID (step 508) and determines whether the mobile terminal 220 has an active PDP context (step 512). If the mobile terminal 220 does not have an active PDP context, the gateway GPRS support node 224 queries a GPRS home location register (GPRS HLR 232) to obtain mobile terminal 220 location information (step 516). Responsive thereto, the gateway GPRS support node 224 receives mobile terminal 220 location information from the GPRS HLR 232 (step 520). Thereafter, the gateway GPRS support node 224 initiates a PDP context activation procedure for the serving GPRS support node 212 that is coupled to a base station 216 that is in communication with the mobile terminal 220 (step 524). Thereafter, the gateway GPRS support node 224 forwards the SMS message 236 to the serving GPRS support node 212 for delivery to the mobile terminal 220 (step 528). In one embodiment of the present invention, the SMS message 236 is forwarded to the serving GPRS support node 212 using a GPRS tunneling protocol.

Figure 6:
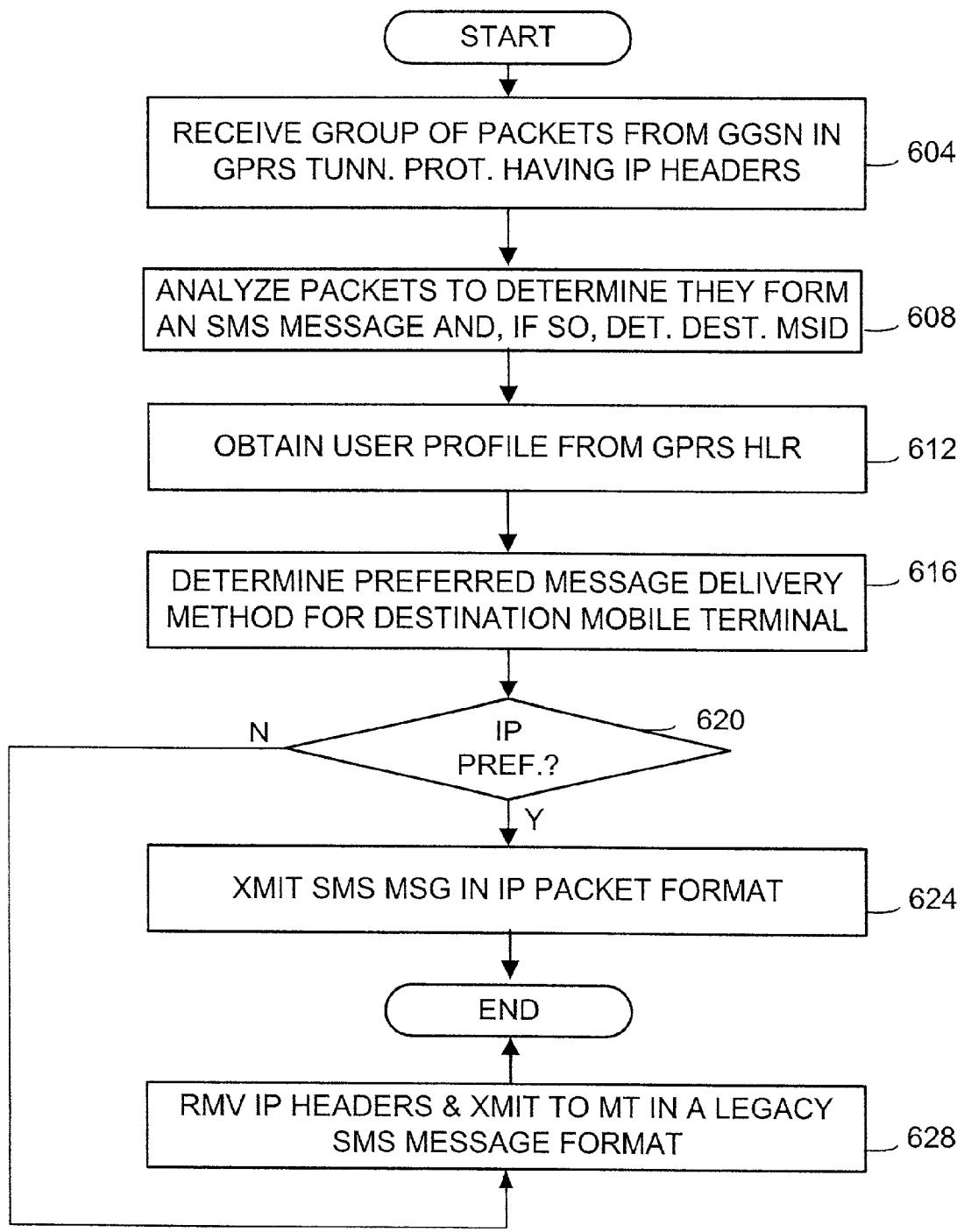
FIG. 6 is a flow chart that illustrates the method performed by a serving GPRS support node for delivering SMS.

FIG. 6 is a flow chart that illustrates the method performed by a serving GPRS support node for delivering SMS messages according to one embodiment of the present invention. The following method of FIG. 6 is illustrated with respect to FIG. 2 for exemplary purposes. Referring now to FIG. 6, a serving GPRS support node 212 initially receives data packets from a gateway GPRS support node 224 in an IP data packet format (step 604). In one embodiment of the present invention, the data packets are received using a GPRS tunneling protocol. With respect to the data packets, in one embodiment of the invention, the data packets comply with an Internet protocol and have Internet protocol defined headers. Thereafter, the serving GPRS support node 212 determines that the packets received, in one embodiment, in the GPRS tunneling protocol, contain data packets that comprise at least one SMS message 236 (step 608). As an optional step, the serving GPRS support node 212 obtains user profile information from a GPRS HLR 232 wherein the user profile is for the mobile terminal 220 that is to receive the SMS message 236 (step 612). Thereafter, the serving GPRS support node 212 examines the user profile to determine a preferred message delivery method (step 616). After analyzing the user profile for the destination mobile terminal 220, the SGSN determines whether the destination mobile profile calls for SMS messages to be delivered in an IP data packet protocol format (step 620). By way of example, a preferred message delivery method can comprise either delivery in an IP format or in a traditional legacy SMS message 236 format. Responsive thereto, the message is transmitted to the mobile terminal 220 having the IP headers in an IP packet format if that is the format specified in the profile (step 624). If not, then the IP header information is removed, the SMS message 236 is reconstructed, and is transmitted to the mobile terminal 220 using traditional or legacy transmission forms and protocols (step 628).

Figure 7A:
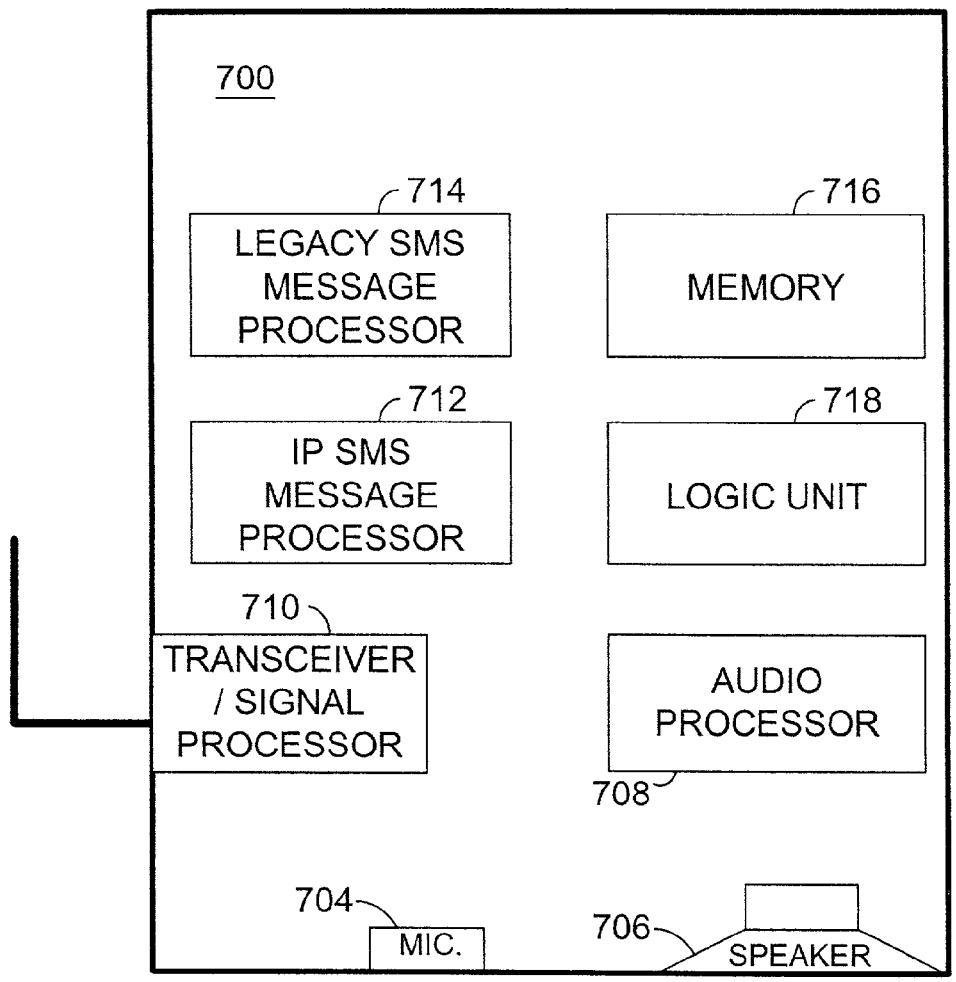
FIG. 7A is a functional block diagram of a mobile terminal formed according to one embodiment of the present invention.

FIG. 7A is a functional block diagram of a mobile terminal formed according to one embodiment of the present invention. Referring now to FIG. 7A, a mobile terminal 700 includes a microphone 704 and a speaker 706 for receiving and playing audio, respectively. Additionally, mobile terminal 700 includes an audio processor module 708 that is coupled to receive microphone inputs from microphone 704 and to produce audio sound for playback to a user through speaker 706. Mobile terminal 700 further includes a signal processor 710 for transmitting and receiving wireless communication signals.

In addition to the audio processing and signal processing provided by modules 708 and 710, mobile terminal 700 further includes an SMS processing module 712 for processing SMS messages that are received in an IP data packet format. It is understood, of course, that the SMS processing module 712 is not limited just to Internet protocol data packets but can include modules for processing data packets formed under different protocols or formats. Mobile terminal 700 further includes a legacy SMS message processing module 714 that is for processing SMS messages that are received by mobile terminal 700 which messages were transmitted using a legacy form or protocol. In one embodiment of the invention, legacy SMS processing module 714 processes only those SMS messages that were transmitted using a legacy protocol for SMS messages. Thus, any messages transmitted using a data packet protocol are completely processed by module 712. In another embodiment of the invention, however, data packet SMS processing module 712 merely serves to receive an SMS message transmitted in a data packet format and to convert the SMS message to a legacy format for processing by legacy SMS module 714. In this embodiment of the invention, module 712 may also be used for converting any type of message or data packet stream transmitted in an IP format into another format for interpretation and processing by mobile terminal 700.

In addition to the aforementioned modules, mobile terminal 700 includes a memory module 716 and a logic unit 718. Logic unit 718 defines the operational logic of the mobile terminal 700 while memory 716 is used to store data and operational parameters.

In one embodiment of the invention, mobile terminal 700 is formed with hardware based state machines as is implied by the system shown in FIG. 7A. Accordingly, for example, the logic of logic unit 718 is formed in hardware using traditional logic circuitry that defines the desired operational functionality. Thus, the methodology illustrated in the preceding flow charts that relate to the mobile terminal 220 are implemented by the hardware within logic unit 718 or the other logic units such as the SMS message processing modules 712 and 714.

Figure 7B:
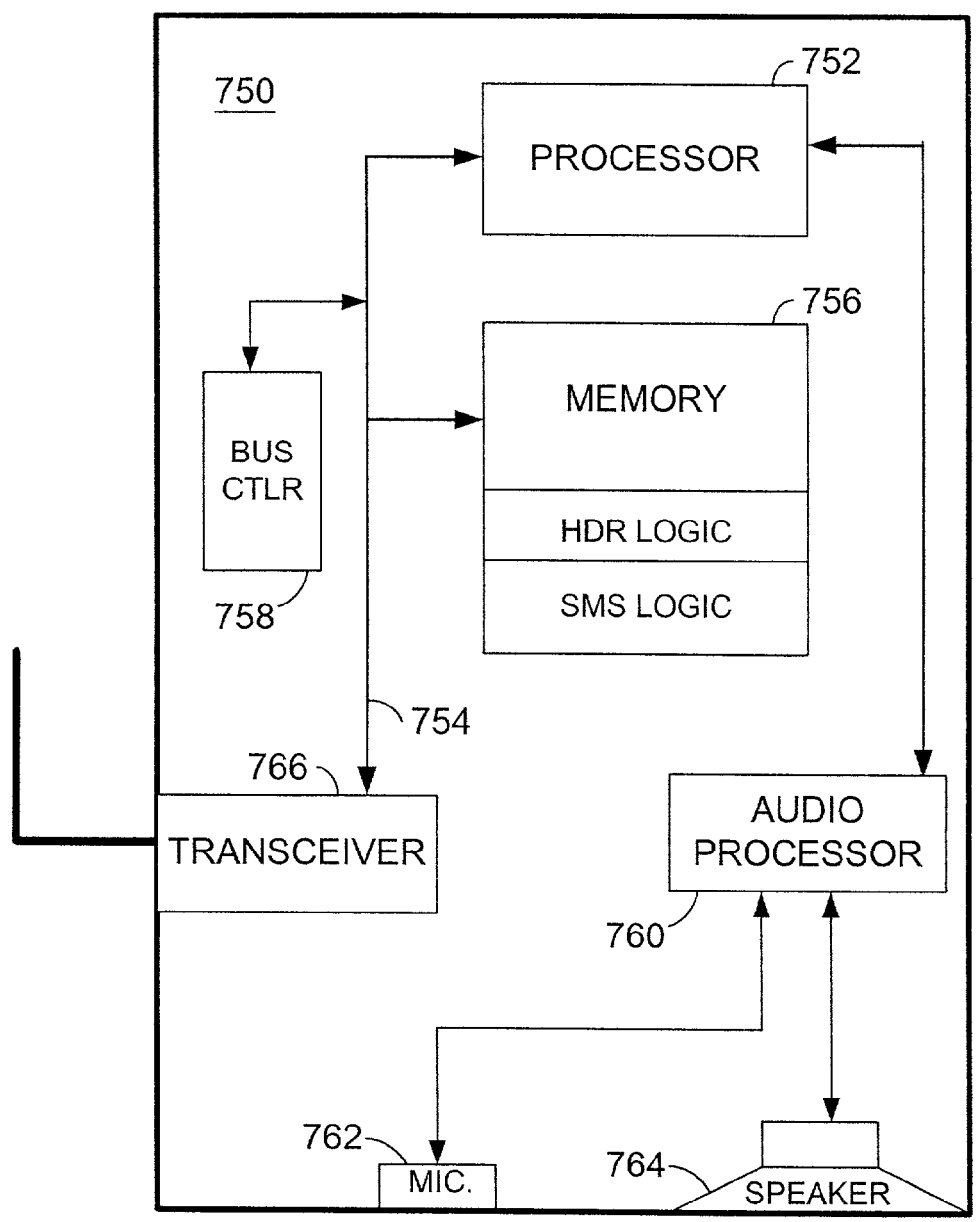
FIG. 7B is a functional block diagram of an alternative embodiment of a mobile terminal according to the present invention.

FIG. 7B is a functional block diagram of an alternative embodiment of a mobile terminal according to the present invention. More specifically, mobile terminal 750 is one that is largely a software based system whose operational logic is defined by internally stored software and is executed by an internal processor. More specifically, mobile terminal 750 includes a processor 752 that is coupled to an internal bus 754 that in turn is coupled to memory 756. Memory 756 defines temporary buffers for storing data as well as memory portions for defining and permanently storing computer instructions that create the operational logic defined herein this application according to the present invention. For example, memory 756 includes computer instructions that, when executed by processor 752, enable the mobile terminal 750 to receive data packets having header information and to determine that the data packets form an SMS message 236 and, accordingly, to create the SMS message 236 for processing.

Thus, the computer instructions further define logic for processing the SMS messages. For example, in one embodiment of the present invention, memory 756 includes computer instructions that prompt the processor to remove the header information from a plurality of received data packets and to create an SMS message. Thereafter, the SMS processing logic is defined by computer instructions also stored within memory 756.

The bus controller 758 serves to control transmissions over the internal bus 754 to enable processor 752 to receive and execute the computer instructions stored within memory 756. Additionally, as may be seen, an audio processor 760 is coupled to internal bus 754. In turn, audio processor 760 is coupled to a microphone 762 and to a speaker 764 for receiving and playing audio, respectively. Additionally, mobile terminal 750 includes at least one transceiver port 766 that is coupled to an antenna for receiving and transmitting wireless communication signals.

While a mobile terminal 750 formed according to the present invention may be implemented in software that is to be executed by an internal processor as demonstrated in the system of FIG. 7B or by hardware, such as the logic hardware modules illustrated in FIG. 7A, it is understood that either embodiment implements the operational logic defined herein in this application according to the present invention. In either case, the mobile terminal 700 or 750 is operable to receive SMS messages in a data packet format and to reconstruct the originally generated SMS message for the user of the respective mobile terminal. Thus, as may be seen, the mobile terminal 700 and 750 enable a user to receive SMS messages transmitted from a GPRS network in a data packet format.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention. The mobile terminal 220 as well as the GGSN and SGSN of the present invention may be formed with state machines in hardware, out of processors based systems that execute stored software instructions, or a combination thereof. In general, any system that defines the novel operational logic defined herein this application is included as a part of the present invention.

The invention claimed is:

1. A system for delivering SMS messages to a mobile terminal, comprising:
    an SMS message center, includes SMS SS7 circuitry for transmitting SMS messages over an SS7 network, and includes SMS IP circuitry for transmitting SMS messages over an IP network to a specified IP port of a specified gateway GPRS support node;
    SMS processing circuitry coupled to the SMS SS7 circuitry and to the SMS IP circuitry for delivering messages thereto for transmission to a mobile terminal;
    a gateway GPRS support node (GGSN) having the specified IP port for receiving SMS messages transmitted in an IP protocol over the IP network from the SMS message center;
    a serving GPRS support node (SGSN) for receiving SMS messages from the gateway GPRS support node, the messages being received in a GPRS tunneling protocol and in an IP protocol;
    wherein the SMS processing circuitry is operable to determine whether to transmit the SMS message to the SGSN by way of the SS7 network or to the GGSN by way of the IP port and further wherein the GGSN is operable to receive SMS messages in a data packet format and to convert the messages to a legacy format for transmission according to a GPRS tunneling protocol; and
    wireless transceiver circuitry for receiving the SMS messages from the SGSN, the wireless transceiver circuitry for delivering the SMS message to the mobile terminal.

2. The system of claim 1, wherein the serving GPRS support node comprises SMS message processing circuitry, which SMS processing circuitry defines SMS message processing logic.

3. The system of claim 1, wherein the gateway GPRS support node is coupled to receive SMS messages from a private data network.

4. The system of claim 1, wherein the gateway GPRS support node is coupled to receive SMS messages from the Internet.

5. The system of claim 1, wherein the IP network between the SMS message center and the gateway GPRS support node comprises a plurality of communication paths and IP routers forming a data packet network wherein the SMS message is transmitted over the plurality of communication paths to a single IP port defined within the GGSN.

6. The system of claim 1 wherein the SGSN is formed to query the GPRS HLR to determine whether to forward the SMS message to a base station for delivery to the mobile terminal in one of an IP data packet format or in a legacy SMS format.

7. The system of claim 1 wherein the SGSN is formed to receive SMS messages in a legacy form from an SS7 network port and in an IP data packet form from a GGSN.

8. A method within a serving GPRS support node operable to deliver SMS messages to a mobile terminal, comprising:
    receiving an SMS message at one of two network ports in one of an IP protocol format and a legacy SMS message format;
    determining whether to convert the SMS message from the IP protocol format to the legacy SMS message format based upon processing capabilities of the mobile terminal; and
    forwarding the message to a wireless network for delivery to a mobile terminal.

9. The method of claim 8 wherein one of the two network ports is a data packet capable port.

10. The method of claim 9 wherein the other of the two network ports is an SS7 telephone network capable port.

11. A serving GPRS support node operable to deliver SMS messages to a mobile terminal, comprising:
    circuitry for receiving SMS messages in a legacy format from an SS7 network; circuitry for receiving SMS messages in a data packet format from a gateway GPRS support node by way of a data packet network; and
    circuitry for determining whether to forward received SMS messages in one of the legacy format or the data packet format based upon the processing capabilities of the mobile terminal.

12. The serving GPRS support node of claim 11 further comprising circuitry to prompt the SGSN to query a GPRS HLR to determine whether a subscriber profile for a mobile terminal that is to receive an SMS message prefers to receive its SMS messages in the legacy or the data packet formats.

13. The serving GPRS support node of claim 11 wherein the circuitry for receiving SMS messages from a gateway GPRS support node is formed to reconstruct received data packets into an SMS message.

* * * * *